(12) United States Patent
Lin et al.

(10) Patent No.: US 7,442,728 B2
(45) Date of Patent: Oct. 28, 2008

(54) METHOD FOR PRODUCING NANOSILICATE PLATES

(75) Inventors: Jiang-Jen Lin, Taichung (TW); Chien-Chia Chu, Taichung (TW)

(73) Assignee: National Chung-Hsing University, Taichung (TW)

( * ) Notice: Subject to any disclaimer, the term of this patent is extended or adjusted under 35 U.S.C. 154(b) by 395 days.

(21) Appl. No.: 11/164,165

(22) Filed: Nov. 13, 2005

(65) Prior Publication Data

US 2006/0063876 A1 Mar. 23, 2006

Related U.S. Application Data

(62) Division of application No. 10/685,213, filed on Oct. 14, 2003, now Pat. No. 7,125,916.

(51) Int. Cl.
C08K 9/06 (2006.01)
C08K 3/34 (2006.01)

(52) U.S. Cl. .......... 523/216; 524/445; 524/446; 524/447; 524/449; 524/555; 428/402; 252/378 R

(58) Field of Classification Search .......... 524/445, 524/446; 523/216; 252/378 R
See application file for complete search history.

(56) References Cited

U.S. PATENT DOCUMENTS

| | | | | |
|---|---|---|---|---|
| 5,101,060 A | * | 3/1992 | Speranza et al. | 558/390 |
| 6,107,387 A | * | 8/2000 | Kaylo et al. | 524/446 |
| 6,765,050 B2 | * | 7/2004 | Lin et al. | 524/445 |
| 7,022,299 B2 | * | 4/2006 | Lin et al. | 423/335 |
| 7,094,815 B2 | * | 8/2006 | Lin et al. | 523/216 |

* cited by examiner

*Primary Examiner*—Vasu Jagannathan
*Assistant Examiner*—Vickey Ronesi
(74) *Attorney, Agent, or Firm*—Pai Patent & Trademark Law Firm; Chao-Chang David Pai

(57) ABSTRACT

The present invention relates to an exfoliating agent and to a process for producing random form of nanoscale silicate plates. The exfoliating agent applied in the present invention has the formula:

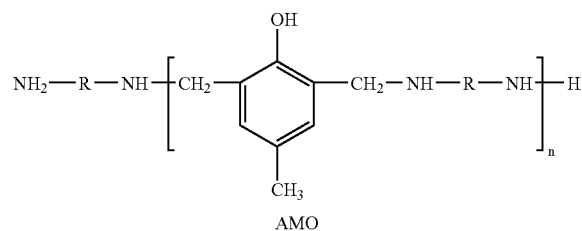

AMO where n = 1 to 5 wherein n=1 to 5 and R is a polyoxypropylene group, poly(oxyethylene/oxypropylene) group, polyoxybutylene group, or polyoxyethylene group. In this invention, layered silicate clays are exfoliated into random silicate plates by acidifying AMO with inorganic acid, adding the acidified AMO to layered silicate clay with agitation, and adding sodium hydroxide or chloride of alkali metal or alkaline-earth metal, in ethanol, water and a hydrophobic organic solvent to the intermediate product and repeating phase separation procedures to isolate random silicate plates from water phase.

18 Claims, 1 Drawing Sheet

Nanosilica Plate (NSP) in Water

METHOD FOR PRODUCING NANOSILICATE PLATES

CROSS-REFERENCE TO RELATED APPLICATIONS

This application is a divisional application of prior U.S. application Ser. No. 10/685,213, filed Oct. 14, 2003, which is patented as U.S. Pat. No. 7,125,916.

BACKGROUND OF THE INVENTION

1. Field of the Invention

The present invention relates to the use of polymeric polyamines as exfoliating agents for producing random nanosilicate plates from layered silicate clays, and particularly to a method for producing nanometer scale silicate plates by directly exfoliating inorganic layered silicate clays with multiple functional quaternary salts, which are prepared specifically from amine-terminating Mannich oligomers (AMO) or amine-terminating epoxy oligomers (AEO). The invention also relates to a method involving ionic exchange between layered silicates and organic quaternary amines, aqueous sodium hydroxide extraction process, recycling the exfoliating agents and finally the isolation of random silicate plates.

2. Description of the Related Art

Currently, inorganic/organic polymer composite materials in a nanometer scale regime (approximately 1~100 nanometer scale) are one of the most important materials, and thus have been widely investigated and developed. Such nanocomposite materials have two different phases including inorganic and organic components, wherein at least one phase is dispersed under a nanoscale regime in a homogeneous manner. Accordingly, the compatibility in the nanoscale mixing between two distinct phases, for example, inorganic clay and organic polymer, is the essential factor for the nanocomposite's physical and mechanical performance. In general, the clay/polymer hybrid materials can be classified into two categories of composites, the intercalated and the exfoliated, on the basis of the clay dispersion in polymer matrix. In an intercalated structure, the silicate plates still maintain their layered structure but with the addition of organic intercalants anchored in the gallery. In the exfoliated form, each individual silicate plate is randomly dispersed in the polymer matrix. Dramatically improved physical properties are often obtained for the exfoliated structure, as demonstrated by the first commercialized Nylon6/montmorillonite nanocomposites. In such a system, the silicate plates (about 100×100×1 nm in dimension) are well-entangled with polymer strands through van der Waals forces and evenly distributed in the polymer matrix. Only a low percentage of exfoliated silicate plates is required to enormously improve the mechanical and physical properties of the blended material.

Since the naturally occurring layered silicate clays are hydrophilic, the dispersion of clay in polymer matrix on a nanometer scale is a general problem. The process requires an enlargement of the clay interlayer distances by means of organic quaternary ammonium incorporation, and thus monomers can enter into the clay interface through ionic exchange reactions. The monomers can then be polymerized within the interlayer space to obtain an exfoliated inorganic/organic polymer nanocomposite material. In principle, the enlarged distance is preferred to be wide enough for monomer or polymer molecules to enter. After exfoliation, the layered structure is randomized into irregular shapes and the silicate plates have different directions without any crystalline form. The random silicate plates are therefore dispersed in organic polymers as nanocomposites.

Conventional intercalating agents such as 12-aminolauric acid, hexadecylamine, fatty amine, bis(2-hydroxyethyl)methyl tallow alkyl amine and stearylamine, usually have low molecular weights and can be converted into the corresponding ammonium salts such as quaternary ammonium chloride salt. Through ionic exchange reactions, the counter ions in interlayer spaces of the clay can be ionically exchanged and hence the interlayer distance expanded to a certain degree.

Referring to the research of T. J. Pinnavaia (Michigan State University), intercalating agent $CH_3(CH_2)_n$—$NH_3^+$ is provided to exchange with metal ion salts within the layer-structured montmorillonite clay (MMT) in preparing intercalated and organic modified MMT, which is then dispersed in diglycidyl ether of bisphenol-A (such as epoxy resin Shell Epon 828) to form a epoxy polymer-clay composite material in a nanoscale dispersion. By using such intercalating agents, the interlayer distances of MMT can be enlarged to 18.0 Å. The epoxy resin can then enter into the interlayer and form an epoxy/clay material through curing polymerization at 75° C. This reference also indicates an improvement in heat distortion temperature. The intercalating agent performs a role of monolayer to bilayer, and even to pseudo-trilayer. The interlayer distance ranges between 13.8-18.0 Å, which allow the epoxy resin to polymerize therein, and further to exfoliate the layered inorganic matter so that performance advantages are achieved.

Japanese Patent No. 8-22946 (Toyota Company) discloses the first commercial inorganic/organic polymer composite material under a nanoscale regime. This composite material is produced by dispersing $[H_3N^+(CH_2)_{11}COO^{-1}]$-montmorillonite in Nylon 6, wherein the aminocarboxylic acid is provided as an intercalating agent and the polymers are formed between layers of the amino acid intercalated clay through condensation of caprolactam monomers to Nylon 6 polymer. In this invention, since the aminocarboxylic acid intercalating agent is hydrophilic, the modified clay is suitable for Nylon 6 compatibility but can not easily mix with nonpolar polymers such as polyethylene and polypropylene in a[[n]] uniform manner. Accordingly, Japanese Patent Publication No. 8-53572 provides other organic onium ions as an intercalating agent to mix with layered silicate, which can be uniformly dispersed in molten polyolefin resin. Unfortunately, the organic onium ions can only enlarge the interlayer distances to a certain degree and the affinity between the intercalating agent and the polyolefin resin is too weak to exfoliate the layered silicates.

In general, the difficulty for the exfoliation by using conventional quaternary ammonium salt is caused by the inherent chemical structure of the clay. The chemical structure of the common smectite clays such as montmorillonite consists of ionic pairs of $\equiv$Si—$O^-$ anions on the surface and counter metal cations. The surface ionic charge interaction tightly binds the neighboring silicate plates together and maintains the primary stacking structure. The exfoliation of the layered silicate plates hence requires a tremendous force to overcome the inherent ionic bridges. Moreover, the conventional process requires two separate steps. The layered silicates are first ionically exchanged with an intercalating agent such as amino acid, or alkyl ammonium quaternary salt. The intercalated silicates at this stage are embedded with organic salts and the gallery distance is widened to a commonly 18-40 Å. In the presence of organic intercalants, the modified clays become organophilic and are possibly exfoliated. Accordingly, there is a need to ameliorate the process by means of providing appropriate intercalating agents and operation conditions which may exfoliate the silicate clay directly for better compatibility with other polymer materials. In addition, it is even more desired to prepare the exfoliated form of silicate plates which are free of organic polymers, so that the random silicate plates in pure form and free of organic contaminations can be mixed with different target polymers to produce improved properties without encountering the dispersion problem in the process.

BRIEF SUMMARY OF THE INVENTION

The main object of the present invention is to provide a method for producing random nanoscale silicate plates, in which the layered clay structure may be exfoliated directly by an exfoliating agent to produce random nanosilicate plates.

Another object of the present invention is to provide a method for producing random nanosilicate plates, whereby the organic exfoliating agent can be recycled through sodium ion exchange and the random silicate plates may be isolated in water suspension without organic contamination.

The present invention involves a multiple-step process: (a) acidifying the exfoliating agent with an inorganic acid to form a quaternary ammonium salt; (b) mixing the acidified exfoliating agent with a swelled inorganic silicate clay so as to exfoliate the clay directly through cationic exchange reaction; (c) adding an aqueous solution containing a hydroxide or a chloride of alkali metal or alkaline-earth metal, ethanol, water and an organic solvent, and then keeping the mixture static to form an upper organic phase and a lower water phase containing the nanosilicate plates, and isolating the lower water phase. The random nanosilicate plates, dispersed in the water phase, contain no impurity and therefore are suitable for further application in modifying polymers.

In order to achieve the above objects, the process of the present invention requires the preparation of the novel exfoliating agents optionally from one of the following synthesis methods: (1) preparing amine-terminated Mannich oligomers (AMO) from polyoxyalkylene amine, p-cresol and formaldehyde at a molar ratio of (n+1):n:2n, where n=1 to 5, the AMO having a general formula:

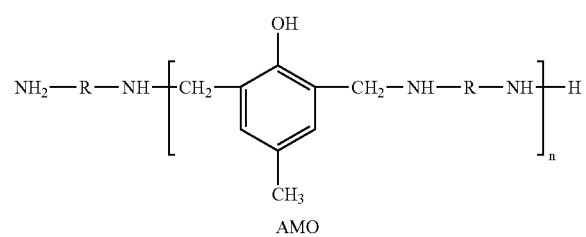

where n = 1 to 5

(2) preparing amine-terminated epoxy oligomers (AEO) from the epoxy opening reaction of polyoxyalkylene amine and diglycidyl ether of bisphenol-A at a molar ratio of (m+1):m, where m=1 to 5, the AEO having the formula:

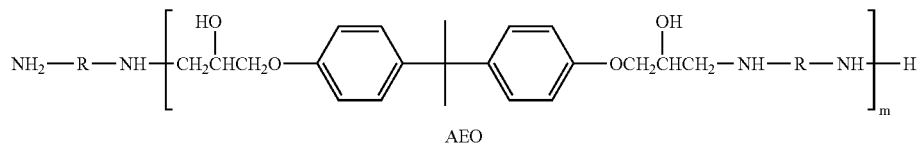

where m = 1 to 5 wherein the polyoxyalklene amines are diamines of the formula:

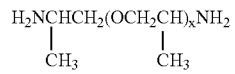

where x=2 to 120 or the molecular weight is in the range of 200 to 8,000.

DETAILED DESCRIPTION OF THE PREFERRED EMBODIMENTS

Figure 1:
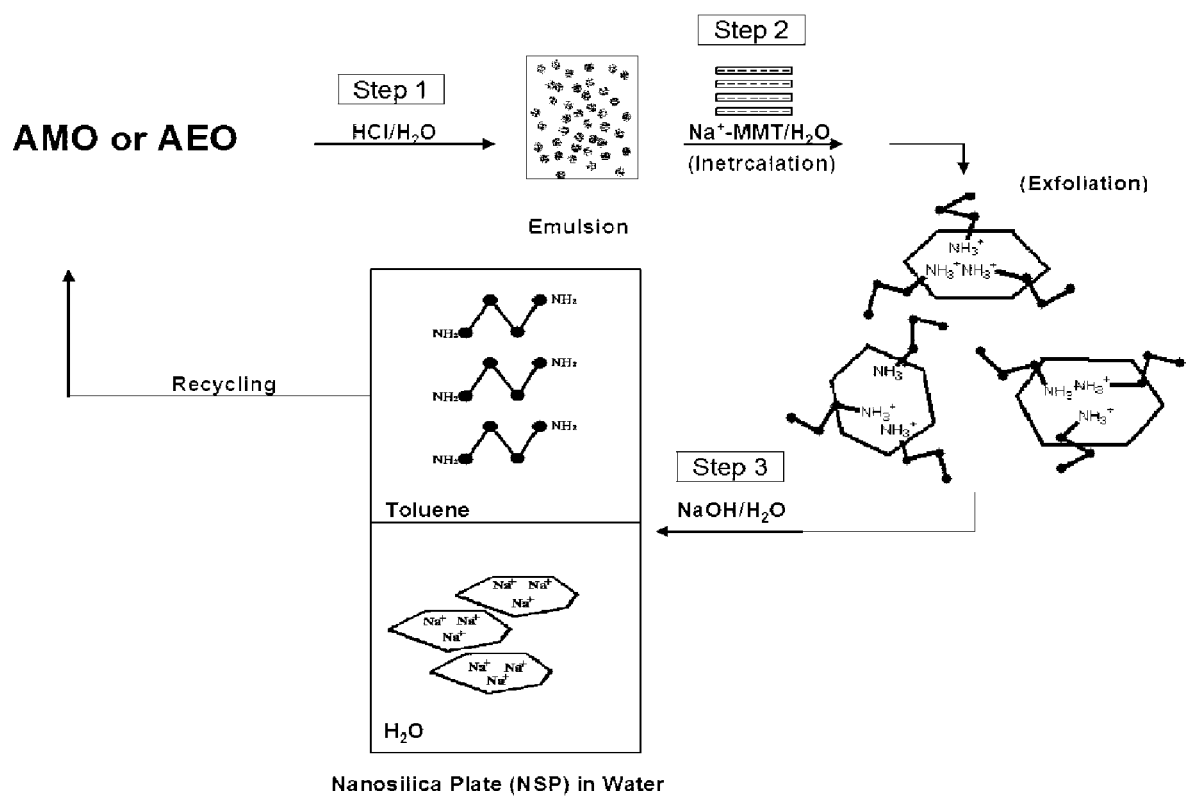
FIG. 1 is a schematic diagram illustrating the steps of the method producing nanosilicate plates in this invention.

The method for producing random nanoscale silicate plates of the present invention can be exemplified by the following process block scheme, illustrating a general process starting with AMO or AEO. The overall process comprises (1) acidifying the exfoliating agent with an inorganic acid to form quaternary ammonium salt; (2) mixing the acidified exfoliating agent with a swelled inorganic silicate clay so as to exfoliate the clay directly through cationic exchange reaction; (3) adding an aqueous solution containing a hydroxide or a chloride of alkali metal or alkaline-earth metal, ethanol, water and an organic solvent, and then keeping the mixture static to form an upper organic phase and a lower water phase containing the nanosilicate plates, and isolating the lower water phase.

The following steps are illustrated in FIG. 1. In step 1, the polyamine exfoliating agent is pretreated with a controlled amount of inorganic acid to produce quaternary ammonium salts in water emulsion. The equivalent ratio of the exfoliating agent to the inorganic acid is preferably 2:1 with respect to amine equivalent to acid, wherein the inorganic acid can be hydrochloric acid, sulfuric acid, phosphoric acid, nitric acid, etc.

In step 2, the acidified polyamine exfoliating agent, in the form of quaternary ammonium salt with multiple cation reactive sites, is added to layered silicate clay, which is pretreated with water for swelling. In the following step, the inorganic clay is added with vigorous agitation to facilitate the ionic exchange reaction between the quaternary salts and the sodium ions of the clay. The molar ratio of amino groups in the exfoliating agent to cationic exchange capacity of the silicate clay is preferably between 1:1 and 3:1.

The clay is selected from one of the following naturally occurring smectite clays, including montmorillonite, kaolin, mica, layered double hydroxide, (J. H. Choy, S. Y. Kwak, Y. J. Jeong, J. S. Park, *Angew. Chem. Int. Ed.* 39, 4041 (2000), M. Templin, A. Franck, A. D. Chesne, H. Leist, Y. Zhang, R. Ulrich, V. Schädler, U. Wiesner, *Science* 278, 1795 (1997), M. B. Armand, in Polymer electrolyte reviews-1 (eds J. R. Maccallum, C. A. Vincent,) (Elsevier applied science, New York and London, 1987), etc., and preferably has a cationic exchange capacity ranging from 50 meq/100 g to 200 meq/100 g. Among the inorganic layered silicate clay, sodium montmorillonite ($Na^+$-MMT) is used in the preferred embodiment. The clay may be commercially purchased from Nanocor, Southern Clay, Kunimine Industries Co. The structure is composed of primary structure containing 8-10 layers of lamellae silicate as the fundamental unit and secondary structure containing the aggregates of primary units. In the primary units, each layer of the lamellae is about 9.6-10 Å thick and the interlayer distance is about 12 Å. The size of the silicate aggregates usually ranges form 0.1μ to 10μ, which is required to be swelled with water to form a slurry beforehand.

In step 3, the hydroxide or chloride of alkali metal or alkaline-earth metal is preferably sodium hydroxide, and added at the same equivalence. More preferred alkali salts are sodium hydroxide, potassium hydroxide, lithium hydroxide, cesium hydroxide, calcium hydroxide, magnesium hydroxide, aluminum hydroxide and their mixtures or derivatives. The alkali compound provides alkalinity to neutralize or convert the quaternary ammonium salt to amine. Consequently, the emulsion is broken and a two-phase solution is formed. The alkaline salt is preferably added in excess amount, for example, at double or triple equivalence to the original clay CEC value. The organic phase formed in step 3 contains the AMO or AEO exfoliating agents which can be easily phase separated from the water phase and then recycled.

In this step, the organic solvent can be alcohol, ether, ketone, ester, nitrile, saturated hydrocarbon, chlorinated hydrocarbon or aromatic hydrocarbon; for example, methanol, ethanol, isopropanol, tetrahydrofuran, diethyl ether, diisopropyl ether, methyl tert-butyl ether, ethyleneglycol dimethylether, dipropyleneglycol monomethyl ether, methyl isobutyl ketone, acetonitrile, ethylnitrile, phenylnitrile, benzylnitrile, ethyl acetate, methyl acetate, pentane, hexane, heptane, cyclohexane, chloroform, dichloromethane, benzene, toluene, xylene, dimethylbenzene, chlorobenzene and methoxybenzene.

The random nanosilicate plates existing in the water phase as obtained in step 3 usually contain no impurity and therefore are suitable for further application in modifying polymers.

It has been discovered that the process for direct exfoliation in accordance with the present invention requires the synthesis of novel exfoliating agents which may be prepared by using the following raw materials and chemicals used in experimental examples cited.

(1) sodium montmorillonite ($Na^+$-MMT), trade name as Kunipia F and CEC=115 meq/100 g, purchased from Kunimine Industries Co., Ltd. Japan, or Nanocor and CEC=120 meq/100 g, purchased from Nanocor Industries Co., Ltd. USA.

(2) p-cresol, purchased from ACROS Co., Mw 108, m.p. 31~34° C., b.p. 202° C.

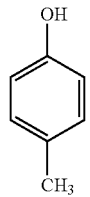

(3) polyoxyalkylene diamine starting material

The polyoxyalkylene diamines to be used as starting materials in accordance with the present invention are poly(propylene glycol) bis(2-aminopropyl ether)s having the formula:

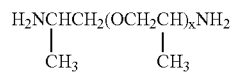

wherein x is a positive number having a value from 2 to 70.

Representative amines have an average molecular weight of about 230 wherein the value of x is between 2 and 3 (Jeffamine® D-230), an average molecular weight of about 400 wherein the value of x is between 5 to 6 (Jeffamine® D-400), an average molecular weight of about 2000 wherein the value of x is about 33 (Jeffamine® D-2000) and an average molecular weight of about 4000 wherein the value of x is about 68 (Jeffamine® D-4000). All of these polyoxyalkylene diamines are commercial products and can be purchased from Huntsman Chemical Co. USA, or from Aldrich Chemical Co. These starting materials are polyoxypropylene-backboned and primary amine terminated diamines.

(4) formaldehyde, purchased from ACROS Co., Mw 30, 37 wt % in aqueous solution.

(5) diglycidyl ether of bisphenol-A (BE-188), epoxide equivalent weight 180, obtained from Chang-Chun Chemical Co. (Taiwan)

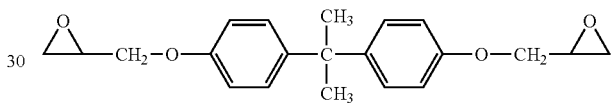

Preparation of the Amine-Terminated Mannich Oligomers

In accordance with the present invention, the required exfoliation agents are prepared by the following sequence:

A polyoxypropylene diamine having the composition as described in the above formula is dissolved in toluene and added with p-cresol at a specified equivalent ratio. The reaction mixture thus formed is heated to 30-60° C. and added with formaldehyde at the preferred molar ratio of polyoxyalkylene amine, p-cresol and formaldehyde at (n+1):n:2n, where n=1 to 5, to obtain a polymeric exfoliating agent, amine terminating Mannich oligomer (AMO). The polyoxypropylene diamine is preferred to have a molecular weight ranging from 2000 to 8,000 g/mol, and the formaldehyde is added at a slow rate to keep the exothermic temperature in the range of 25° C. to 160° C.,

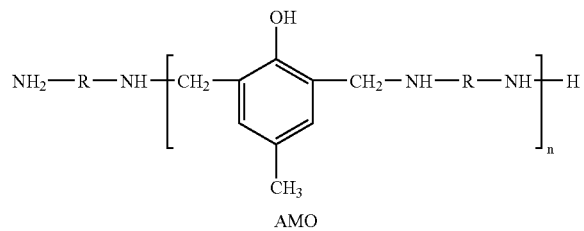

where n = 1 to 5

In the present invention, the polyoxyalkylene amine preferably has molecular weight ranging from 200 to 8,000; and more preferably from 400 to 2,000 and even more preferably from 1,000 to 2,000. Polyoxyalkylene amine can be, for example, polyoxypropylene diamine, polyoxyethylene diamine, poly(oxyethylene-oxypropylene)diamine, polyoxybutylene diamine, etc., wherein polyoxypropylene diamine is preferred. A generic chemical structure is depicted below, where x=2 to 120 or the molecular weight is in the range of 200 to 8,000.

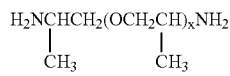

In the above steps, formaldehyde is preferably added at an equivalent ratio ranging from 0.5 to 2.0 molar ratio to amine, whereby more than 25 wt % of the total AMO copolymers have molecular weight more than 5,000 and less than 10,000 g/mol.

Optionally, the polymeric polyamine exfoliating agent may be of another class of compound, namely the amine terminated epoxy oligomers (AEO), which may be prepared from the epoxy opening reaction of polyoxyalkylene amine and diglycidyl ether of bisphenol-A at a molar ratio of (m+1):m, where m=1 to 5, wherein the polyoxyalkylene amine has a molecular weight ranging from 200 to 8,000 g/mol and preferably 400 to 2,000 g/mol.

swelled by vigorously stirring for 4 hours to form an earth-colored uniform dispersion before the ionic exchange reaction. The following illustrates the experimental procedures which are performed in a glass reactor equipped with a mechanical stirrer, a thermometer, a condenser, a heating mantle and temperature controller.

To Prepare the amine-terminating Mannich oligomer (AMO) as the exfoliating agent, to a reactor, p-cresol (13.6 g, 126 mmoles) and poly(propylene glycol)diamine (Jeffamine D-2000, 378 g, 189 mmole) were dissolved in toluene (200 ml) and the mixture was heated to 90° C. for 3 hours. Formaldehyde (37 w % in water, 30 g, 278 mmole) is then gradually added in a duration of 4.5 hours, at a rate of about 6-7.5 ml/hour. During the process, the solution temperature was exothermic up to 90° C.-130° C. Stirring continuously for 5 hours, a very viscous product was obtained. According to the gel permeation chromatography (GPC) analysis, three major peaks at Mw 3,100, Mw 6,200 and Mw 9,200 were observed, on the basis of polystyrene as the GPC standard. Amine titration values of the AMO product are 0.4 meq/g for primary amine and 0.56 meq/g for secondary amine, and none for tertiary amine, indicating the formation of Mannich secondary amine and the conversion of primary amine into the desired products.

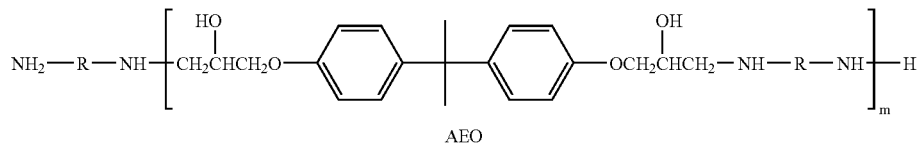

where m = 1 to 5

In this invention, by means of cationic exchange reaction between AMO or AEO and sodium montmorillonite, interlayer distances of the clay are enlarged through intercalation and eventually exfoliation to silicate plates in a random manner. However, the ionic bridges between AMO or AEO and individual silicate plates still exist in a form of the quaternary ammonium salt/clay complex. In order to separate the exfoliated silicate plates from the organic exfoliating agents, an aqueous solution of alkaline metal hydroxide such as sodium hydroxide is added into the hybrids to exchange the organic quaternary ammonium cations with sodium ions. The random nanosilicate plates can then be isolated in water suspension. The process requires repetitive displacement reactions for several times by adding solvent mixtures of ethanol/water/toluene. The extraction step requires an appropriate solvent composition which causes the two-phase separation, with the AMO or AEO amines in the upper toluene phase and the nanosilicate plates suspension in the lower water phase. For the overall process, the purified nanosilicate plate suspension in water can be obtained and the AMO or AEO exfoliating agent is recycled.

More detailed procedures of the present invention are described in the preferred Examples and the Comparative Examples.

EXAMPLE 1

Exfoliation of Na$^+$-MMT by Using AMO Agent

Sodium montmorillonite (Na$^+$-MMT) (10 g, 11.5 meq) is preliminarily dispersed in water (lL, 80° C.) in a beaker and Step (1): Acidification of the AMO Exfoliating Agent The AMO product (57.5 g; 23 meq) was not completely soluble in water. With the addition of concentrated hydrochloric acid (35 w % in water, 1.2 g; 11.5 meq), the product became soluble or formed an emulsion solution at 80° C. after being stirred for 30 minutes. The AMO quaternary salt was hence prepared for the MMT exfoliation.

Step (2): Exfoliation of Sodium Montmorillonite Clay

The acidified AMO emulsion (from Step 1) was poured into the pre-prepared dispersion of Na$^+$-MMT in water at 80° C. while a vigorous agitation was continued for over 5-hour period. After standing at room temperature, the AMO/MMT hybrid was isolated by separating the floating solid material from the water phase. A sample of the isolated hybrid was analyzed by X-ray diffraction and shown to have none of crystalline phase (exfoliation).

Step (3): Displacement Reaction of AMO Quaternary Ammonium Salt with Sodium Ion (I)

To the AMO/MMT hybrid (from Step 2), which was dispersible in toluene and ethanol but not in water, was directly added an aliquot of aqueous NaOH (4.6 g in water). With agitation, the mixture became a cream-colored thick suspension. The solid suspension was filtered and washed by mixing with ethanol (750 ml). A second washing procedure was performed by adding and stirring with another portion of ethanol (lL) and filtrated again to obtain a cream-colored translucent AMO/NSP (nanosilicate plate) hybrids. The hybrid was analyzed by thermal gravimetric analysis, the result of which indicated an organic (AMO) composition of 40 weight %.

Displacement Reaction of AMO Quaternary Ammonium Salt with Sodium Ion (II)

A second displacement reaction was carried out to remove organic AMO exfoliating agent completely. In this step, the procedure was repeated by mixing the above AMO/NSP hybrid product with another portion of NaOH (9.2 g) in ethanol (IL), water (IL), and toluene (IL). After vigorously stirring and standing for overnight, the mixtures were phase separated into an upper toluene phase containing the AMO exfoliating agent, a middle phase of clear ethanol, and a lower water phase containing nanosilicate plates (NSP). The AMO copolymers in toluene phase can be easily isolated by solvent evaporation and recycled.

COMPARATIVE EXAMPLE 1

The above experimental procedures were repeated but using only a half amount of AMO exfoliating agent prepared from the Mannich reaction of p-cresol, poly(propylene glycol)diamine and formaldehyde. The resultant AMO/MMT from the Step (3) was analyzed by X-ray diffraction (XRD) which indicated that the basal spacing was 50 Å, indicative of the MMT in an AMO intercalating mode rather than exfoliation. The result demonstrates the importance of AMO copolymer amount used for the exfoliation and the preparation of nanosilicate plates.

In Table 1, the interlayer distances (or XRD basal spacing) and weight ratios of organic composition of $Na^+$-MMT starting material, AMO/MMT exfoliated (Example 1) and intercalated (Comparative Example 1) are summarized in Table 1.

COMPARATIVE EXAMPLE 2

The experimental procedures of Example 1, Steps 1-3, were repeated but using a different synthesis of exfoliating agent (abbreviated AMO-1), and repeating the synthesis for the amine-terminating Mannich oligomers (AMO). The Mannich reaction was repeated with the same equivalent ratio of starting materials and reaction temperature, but the formaldehyde was added to the p-cresol, poly(propylene glycol) diamine (Jeffamine D-2000) in one-portion rather than dropwise. The resultant AMO-1 was analyzed and the result exhibited a lower molecular weight distribution than that of AMO in Example 1. The GPC analysis indicated also three peaks at Mw 670, Mw 3,000 and Mw 6,000, on the basis of polystyrene standard.

By following the procedures in Step (2), the resultant AMO-1/MMT exhibited a XRD basal spacing (56 Å) rather than an exfoliating non-crystalline pattern. By continuing the Step (3), the solid became a cream-colored suspension and the AMO-1 polyamine cannot be separated from MMT, since both organics and inorganics were present in the toluene phase. The results indicated that the low molecular weight of AMO-1 rendered an intercalated MMT complex rather than an exfoliated MMT. As a consequence, the inorganic MMT and organic AMO-1 cannot be separated. Hence it is important for AMO to have a suitable molecular weight for exfoliating layered silicate into random silicate plates.

COMPARATIVE EXAMPLES 3-5

The experimental procedures of Example 1 were repeated from Step (1) to Step (3). In the step (3), the two phase solvent was toluene/water without the addition of ethanol. It is found the hybrid product can not be filter due to the high viscous and sticky nature of the product. It is realized that the proper mixture of solvent including ethanol is required to isolate the random silicate plates in the process.

EXAMPLE 2

A Larger Scale Experiment

Sodium montmorillonite ($Na^+$-MMT 100 g, cationic exchange capacity 115 mequiv/100 g) was dispersed into 10 L of hot water (about 80° C.) by using a homogenizer. Amine terminating-Mannich oligomer (AMO) was dissolved in water (575 g) and concentrated hydrochloric acid (35 wt % in water 12 g) were mixed at 80° C. for 30 minutes. The GPC analysis of high Mw AMO used in Example 2 shows three peaks at 4,000, 8,100 and 12,600. The solution was poured into the hot aqueous dispersion of $Na^+$-MMT/Water with a vigorous agitation for 5 hours at 80° C. to complete the intercalation. The solution becomes phase separated. Repeat procedures of Example 1, but all the materials are added in quantities ten time as much. The same nanosilicate plates as Example 1 can be eventually obtained.

TABLE 1

Exfoliation or intercalation of AMO/clay by using different acidified ratio and different equivalent amount of exfoliating agents.

|  | Equivalent ratio ($NH_2/H^+$/MMT) | Interlayer distance (Å) | Organic/clay weight ratio[a] (w/w %) |
|---|---|---|---|
| Comparative Example 1 | 1:1:1 | 50 | 72/28 |
| Comparative Example 3 | 1:3:3 | 39 | 45/55 |
| Comparative Example 4 | 1:2:2 | 50 | 57/43 |
| Comparative Example 5 | 2:3:3 | 50 | 66/34 |
| Example 1 | 2:1:1 | Exfoliated | 83/17 |

[a]Organic/silicate fraction was determined by TGA at 850° C.

In the Comparative Examples 1, 3, 4 and 5 using the molar ratio of AMO exfoliating agent at one or less than one equivalent to clay CEC, the results showed the intercalating clay. Only at 2:1 excess amount of the same AMO, the clay may be exfoliated.

As indicated in the above Examples 1 and 2, the preparation of random silicate plates can be performed by using an AMO quaternary ammonium salt as the exfoliating agent. The process required several steps including exfoliation, sodium hydroxide exchange and phase toluene/ethanol/water extraction. The controlled experiments demonstrated that the AMO molecular weight, molecular structure, phase extraction solvent and sodium hydroxide equivalent are crucial parameters for effectively producing random silicate plates. The nanosilicate plates produced in the present invention are primary structure and exhibit ionic character and high-aspect ratio (surface versus thickness) properties, which are suitable for improving physical/mechanical properties of polymers, for example, resistance to solvent, resistance to heat distortion, gas barrier properties, rigidity, etc.

EXAMPLE 3

Exfoliation of $Na^+$-MMT by Using AEO Agent

The following experimental procedures are a typical example for the preparation of AEO exfoliating agent and its uses for ionic exchanging with $Na^+$-MMT clay.

Preparation of the Amine-Terminating Epoxy Oligomer (AEO) Exfoliating Agent

To a glass reactor was added poly(propylene glycol)diamine (Jeffamine D-2000, 320 g, 160 mmoles) and diglycidyl ether of bisphenol-A (38 g, 100 mmoles) dissolved in toluene (500 ml) and the mixture was heated to 90° C. for 3 hours. The temperature was slowly increased until all solvent was removed from a trap condenser. The resulting product was a viscous and yellowish liquid. The polymeric amines were further analyzed by amine titration and GPC (three peaks at 660, 1,900, and 6,000) to confirm the oligomeric structure. The conversion of primary amines into secondary amines through the reaction with DGEBA was evidenced by amine titration, showing 0.36 meq/g for primary amine (theoretical 0.33 meq/g) and 0.67 meq/g for secondary amine (theoretical 0.66 meq/g). The polymeric amine was used for the following exfoliation process.

Step (1): Acidification of the AEO Exfoliating Agent

The AEO product prepared in the above synthesis (64 g) was not completely soluble in water. With the addition of concentrated hydrochloric acid (35 w % in water, 2.5 g), the product became soluble or formed an emulsion solution at 80° C. after being stirred for 30 minutes. The AEO quaternary salt was hence prepared for the MMT exfoliation.

Step (2): Exfoliation of Sodium Montmorillonite Clay

The acidified AEO emulsion obtained from Step (1) was poured into a suspension of $Na^+$-MMT (20 g, CEC=120 meq/100 g) in water at 80° C. while a vigorous agitation was continued for over 5 hour period. After adding ethanol (100 ml) and standing at room temperature, the AEO/MMT hybrid was isolated by separating the floating solid material from the water/ethanol phase. A sample of the isolated hybrid was analyzed by X-ray diffraction and shown to have none of crystalline phase (exfoliation).

Step (3): Displacement Reaction of AEO Quaternary Ammonium Salt with Sodium Ion

To the AEO/MMT hybrid obtained in Step (2), which was dispersible in toluene and ethanol but not in water, was directly added an aliquot of aqueous NaOH (2.4 g in water). With agitation, the mixture became a cream-colored thick suspension, to which ethanol (500 ml) was added. A second washing procedure was performed by adding and stirring with another portion of ethanol (500 ml) and filtrated again to obtain a cream-colored translucent AEO/NSP (nanosilicate plate) hybrids. The second washing procedure was repeated by adding another portion of NaOH (2.4 g in 25 ml water), ethanol (300 ml) and toluene (150 ml). The mixture was agitated and stood for phase separation. A three-layer suspension was obtained and the bottom water layer contained nanosilicate plates.

What is claimed is:

1. A method for producing random form of nanosilicate plates, comprising the steps of:
   (a) preparing amine-terminating Mannich oligomers (AMO) from polyoxyalkylene amine, p-cresol and formaldehyde to obtain a polymeric exfoliating agent having a general formula:

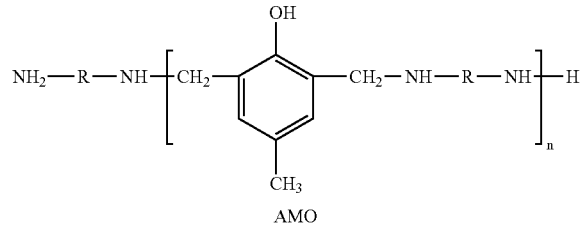

AMO where n = 1 to 5 wherein n is from 1 to 5; R represents an organic group selected from the group consisting of polyoxypropylene groups, poly(oxyethylene/oxypropylene) groups, polyoxybutylene groups, and polyoxyethylene groups; wherein said formaldehyde is added at an appropriate addition rate by which the exothermic temperature is kept in the range of 25° C. to 160° C.;
   (b) adding inorganic acid to said AMO to form an acidified AMO;
   (c) mixing said acidified AMO with a swelled inorganic layered silicate clay so as to exfoliate said silicate clay directly through cationic exchange to form an exfoliated silicate clay; and
   (d) mixing an aqueous solution containing a hydroxide or a chloride of alkali metal or alkaline-earth metal, ethanol, water and an organic solvent with said exfoliated silicate clay obtained in step (c) to form a mixture and then, after mixing, keeping the mixture static to form an upper organic phase and a lower water phase containing nanosilicate plates.

2. The method as claimed in claim 1, wherein said polyoxyalkylene amine used in said step (a) has molecular weight ranging from 400 to 4,000 g/mol.

3. The method as claimed in claim 1, wherein said polyoxyalkylene amine used in said step (a) has molecular weight ranging from 1,000 to 2,000 g/mol.

4. The method as claimed in claim 1, wherein said polyoxyalkylene amine used in said step (a) is selected from the group consisting of polyoxypropylene diamine, polyoxyethylene diamine, polyoxybutylene diamine and poly(oxyethylene-oxypropylene)diamine.

5. The method as claimed in claim 1, wherein said polyoxyalkylene amine used in said step (a) is polyoxypropylene diamine.

6. The method as claimed in claim 1, wherein said polyoxyalkylene diamine, p-cresol and formaldehyde in said step (a) are added at a molar ratio (n+1):n:2n, wherein n is 1 to 5.

7. The method as claimed in claim 1, wherein more than 25 wt % of said exfoliating agent obtained in said step (a) has molecular weight ranging from 5,000 to 10,000.

8. The method as claimed in claim 1, wherein said exfoliating agent and said inorganic acid are mixed in an equivalent ratio 2:1 in said step (b).

9. The method as claimed in claim 1, wherein said inorganic acid used in said step (b) is selected from the group consisting of hydrochloric acid, sulfuric acid, phosphoric acid and nitric acid.

10. The method as claimed in claim 1, wherein the molar ratio of amino groups in said exfoliating agent to cationic exchange capacity of said silicate clay ranges from 3:1 to 1:1 in said step (c).

11. The method as claimed in claim 1, wherein said silicate clay used in said step (c) is selected from the group consisting of montmorillonite, kaolin, mica and talc.

12. The method as claimed in claim 1, wherein said silicate clay used in said step (c) has a cationic exchange capacity ranging from 50 meq/100 g to 200 meq/100 g.

13. The method as claimed in claim 1, wherein said hydroxide or chloride of alkali metal or alkaline-earth metal used in said step (d) is sodium hydroxide.

14. The method as claimed in claim 1, wherein said hydroxide or chloride of alkali metal or alkaline-earth metal is added at the same equivalence in said step (d).

15. The method as claimed in claim 1, wherein said organic solvent used in said step (d) is selected from the group consisting of ether, ketone, ester, nitrile, saturated hydrocarbon, chlorinated hydrocarbon and aromatic hydrocarbon.

16. The method as claimed in claim 1, wherein said organic solvent used in said step (d) is selected from the group consisting of tetrahydrofuran, isopropyl ether, methyl tert-butyl ether, methyl isobutyl ketone, ethylnitrile, ethyl acetate, pentane, hexane, heptane, cyclohexane, dichloromethane, benzene, toluene, dimethylbenzene, chlorobenzene and methoxybenzene.

17. The method as claimed in claim 1, wherein said hydroxide or chloride of alkali metal or alkaline-earth metal is added at 1 to 5 equivalences in step (d).

18. The method as claimed in claim 1, wherein said organic phase formed in said step (d) comprises said exfoliating agent suitable for recycling.

* * * * *